April 23, 1968 W. C. FREHSE 3,378,957
GASKET ASSEMBLY
Filed Feb. 23, 1966 2 Sheets-Sheet 1

INVENTOR
WALTER C. FREHSE
BY
ATTORNEYS

April 23, 1968   W. C. FREHSE   3,378,957
GASKET ASSEMBLY
Filed Feb. 23, 1966   2 Sheets-Sheet 2
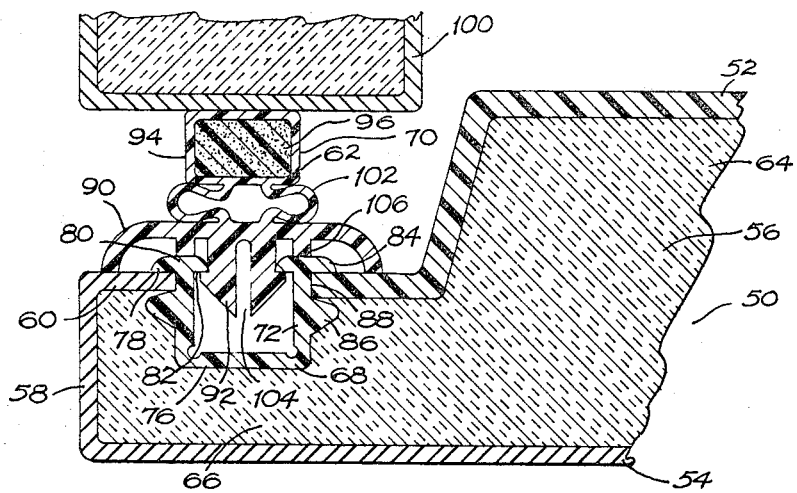
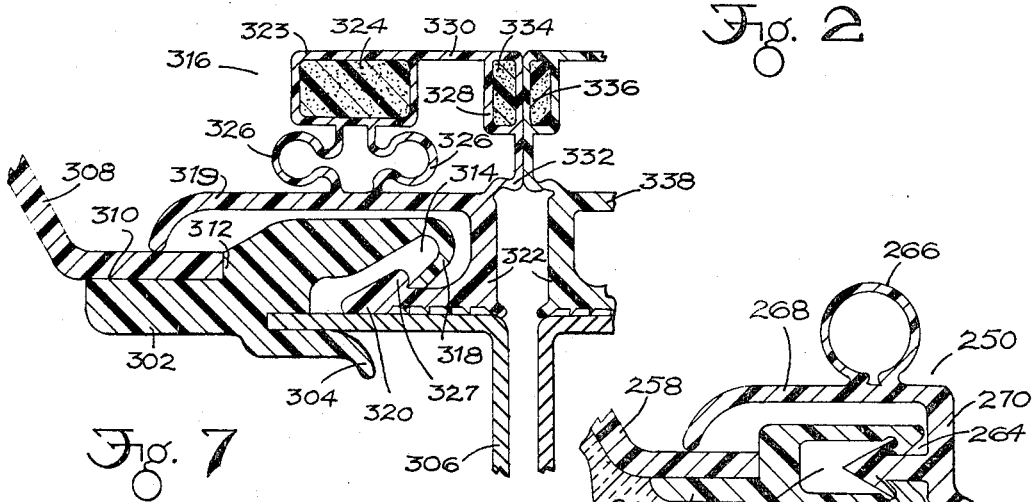
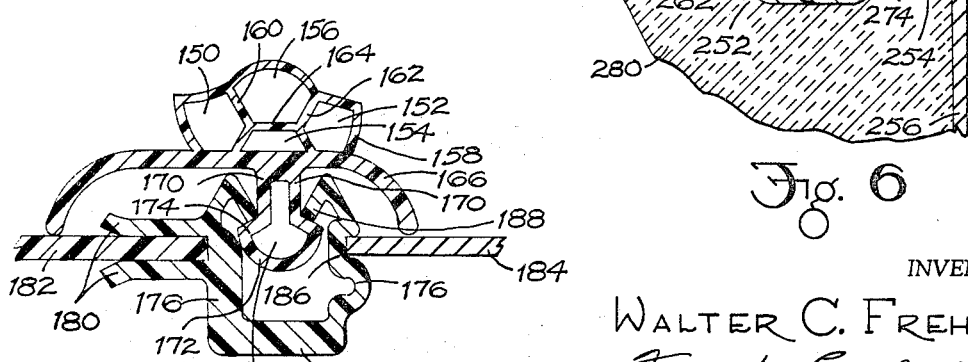
INVENTOR
WALTER C. FREHSE
BY Frank J. Earnheart
James A. Lucas
ATTORNEYS

United States Patent Office 3,378,957
Patented Apr. 23, 1968

3,378,957
GASKET ASSEMBLY
Walter C. Frehse, Evansville, Ind., assignor to The General Tire & Rubber Company, a corporation of Ohio
Filed Feb. 23, 1966, Ser. No. 529,537
2 Claims. (Cl. 49—487)

ABSTRACT OF THE DISCLOSURE

A refrigerator gasket is composed of a rigid retainer adapted to be mounted between the outer shell and the inner liner of the door and a flexible sealing element which is snapped into and retained within the retainer. An insulating material such as polyurethane foam may be used in the door to assist in holding the rigid retainer in place.

This invention pertains generally to refrigerators and other thermally insulated cabinets typically provided with one or more doors attached thereto and adapted to close the access opening thereof. More particularly, this invention relates to a gasket assembly which finds utility with insulated doors of the type used on these cabinets. Said gasket assembly includes a first relatively rigid portion which can be positioned and anchored into place in the frame of the door and a second portion, generally softer than the first portion, which is adapted to provide a seal between the door and the cabinet or between two contiguous doors.

For many years, gaskets have been used to provide a seal between refrigerator cabinets and their respective doors, said gaskets serving to provide a thermal barrier between the cold temperatures in the refrigerator and the ambient room temperatures. Desirably a material, in order to be suitable for use in gasket manufacture, must have good durability, be readily cleanable, and in addition should be attractive or appealing to the consumer. Furthermore, in order to minimize costs, the gasket must be designed so that it will be capable of easy installation on the assembly line. A typical material which has been found to be quite suitable for the manufacture of these gaskets is polyvinyl chloride. Gaskets which have been made from this material are customarily installed on the door of a refrigerator utilizing a metal retainer strip and screws to mount the gasket on to the door frame and secure it thereto. The assembling operation is awkward and time consuming, and therefore constitutes an item of considerable expense.

A principal object of the present invention is to provide a gasket assembly which eliminates the necessity of screws or other fastening devices to attach the gasket to the door of a refrigerator or other cabinet.

Another object is to provide a gasket assembly which has particular utility in doors having foamed-in-place insulation wherein a part of the assembly is incorporated into the frame of the door prior to foaming, and the remainder of the assembly is installed after the foaming operation is completed.

It is yet another object of this invention to provide a snap-in gasket assembly comprising a first relatively rigid member interposed between the outer shell and inner liner of a refrigerator door, and a relatively pliable sealing portion which is snapped into said rigid member.

These and other objects are accomplished in the manner to be hereinafter described, with particular reference being given to the drawings in which:

FIGURE 2 represents one embodiment of the invention wherein the gasket assembly is installed on a door, said door being closed against the frame of a refrigerator;

FIGURE 3 is a cross-sectional view of another gasket assembly of this invention;

FIGURE 6 shows still another variation, this one depicting the rigid portion held in place, at least partially, by the thermal insulating material; and FIGURE 7 is a cross section showing the salient features of the invention as applied to a gasket assembly of the type used on twin door cabinets without a center mullion.

This invention relates generally to a gasket assembly for the door of a thermally insulated cabinet, said assembly containing an elongated, relatively rigid member adapted to be mounted on the door, and a sealing member having a first portion thereof adapted to be snapped into engagement with said rigid member and to resist removal therefrom, and a second portion adapted to engage the frame of the cabinet to form a seal therewith.

Figure 1:
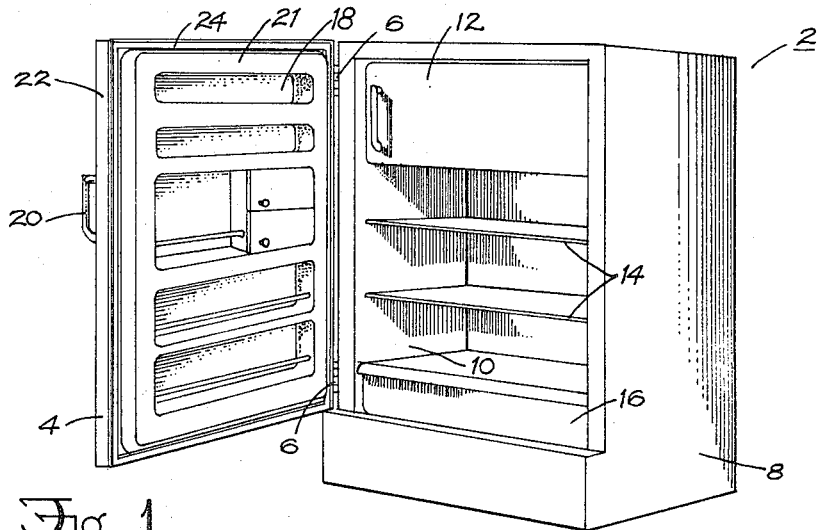
FIGURE 1 is a perspective view of a typical refrigerator with the door open showing the location of the sealing gasket therearound.

Referring specifically to FIGURE 1, there is shown a refrigerator 2 of conventional design having a door 4 attached thereto by a pair of hinges 6. The refrigerator comprises an outer metal shell 8 and an inner liner 10, typically of a polymeric material such as plastic which is easy to clean and which resists mildew and fungal attack. A freezer compartment provided with a separate door 12 occupies the upper portion of the refrigerator, while the remainder of the space is filled with shelves 14 and a sliding drawer 16 for fresh produce and the like. The door 4 is generally provided with several shelves 18 and a handle 20 to facilitate opening and closing the same. The inside portion 21 of the door is, including the shelves, typically made of a rigid polymeric material and will hereinafter be referred to as the inner liner. The outside of the door is generally of metal and will hereinafter be referred to as the outer shell. The edges of the outer shell are typically bent twice at right angles to form the edge 22 of the door, and inwardly turned flanges which terminate a short distance from the inner liner 21. Disposed between the flanges and the edges of the inner liner is the gasket 24, the details of which will be hereafter described in more detail.

The spaces between the inner liner and outer shell of the door and the refrigerator cabinet are typically filled with a material having good thermal insulation properties. Although many different materials have been utilized for this purpoe, it has recently been found that a rigid foam such as polyurethane produces an excellent insulation. This insulation can be produced in situ by incorporating the appropriate amount of reactants in the space between the inner liner and outer shell and causing them to react to expand and fill the space. This approach has been instrumental in permitting refrigerator manufacturers to produce cabinets and doors having relatively thin walls yet possessing favorable insulating properties.

FIGURE 2 shows the details of one embodiment of the present invention wherein a gasket assembly is installed on a door which is in the closed position against the frame of a refrigerator or other insulated cabinet. The door 50 comprises an inner liner 52, preferably of plastic, and a metal outer shell 54, the space therebetween being filled with a suitable insulation 56 of foam, fiberglass, or the like. The outer shell is provided with two right angle bends to form the edge 58 of the door and a flange 60 which is substantially coplanar but spaced apart from the edge of the inner liner. The gasket assembly 62 is designed to be installed in the space between the flange 60 and the inner liner.

The gasket assembly comprises a channel strip 68 and a sealing member 70. The channel strip, preferably composed of a rigid material such as rigid PVC, comprises a pair of copending legs 72 joined together by an intermediate base portion 76 to thereby form the channel. Each leg terminates in a flange 78 provided with an outwardly directed tab 84 and inwardly directed tab 80, undercut to form a lip 82. The tap 84 cooperates with a longitudinally extending rib 86 to form a groove 88 into which the flange 60 of the outer shell 54 or the inner liner 52 is held.

The sealing portion of the assembly comprises a generally planar base 90, a locking tab 92, and a rectangular channel 94. The ends of the base 90 curve down into contact with the shell and inner liner of the door and serve to conceal the channel strip 68. A strip of flexible magnetic material 96 is positioned within the rectangular channel 94 and serves to provide a substantially airtight thermally effective seal between the door and the frame 100 of the refrigerator. The channel 94 and magnet are resiliently spaced from said base 90 by a pair of flexible plicated ribs 102. The locking tab 92 is generally wedge-shaped and is provided with a groove 104 which permits the two portions of the tab to be urged toward one another during installation of the sealing member into the channel strip 68. Lip 82 serves to retain the tab within the channel and to prevent removal therefrom. A pair of spaced ribs 106 abut flanges 78 and serve to prevent unnecessary movement of the sealing member within the channel. Preferably, these ribs are sufficiently long so that when the sealing member is installed in the channel, a slight amount of extra pressure must be exerted to urge the locking tab 92 past the tabs 80 to permit the two parts of the tab 92 to spring away from one another and to engage the lips 82 on the underside of the tabs 80.

Referring now to FIGURE 3, there is shown a modification of the present invention wherein the sealing member of the gasket is provided with a honeycomb section of the type described and claimed in U.S. 2,908,949 assigned by the present inventor to the assignee of the present invention. This honeycomb portion consists generally of four closed cells 150, 152, 154 and 156 spaced from one another by an outer wall 158 and a plurality of internal webs 160, 162, 164. This honeycomb section is connected to a generally planar base 166. A locking tab 168 is integral with the underside of the base 166 and comprises two parallel legs 170 and a semi-circular section 172 connected to each leg by a short diagonal shoulder portion 174. This entire sealing member is preferably composed of a soft pliable material such as plasticized polyvinyl chloride whereby the honeycomb portion of the gasket, when the door is closed against the frame of a refrigerator, deformably contacts said frame to provide a good seal therewith.

The locking tab 168 is inserted within, and securely held, by a rigid channel shaped member formed by two parallel legs 176 and an intermediate base 178. A pair of spaced gripping members 180 extend laterally from one of the legs and are clamped onto the inner liner 182. A locating groove 186 serves to position said channel members relative to the inwardly turned flange 184 of the outer shell. Each leg 176 of the channel member terminates in an inwardly directed portion 188 which is inclined diagonally toward the base 178 of the channel. This terminating portion engages the diagonal shoulder portion 174 of locking tab 168 to retain the tab within the channel member.

Figure 4:
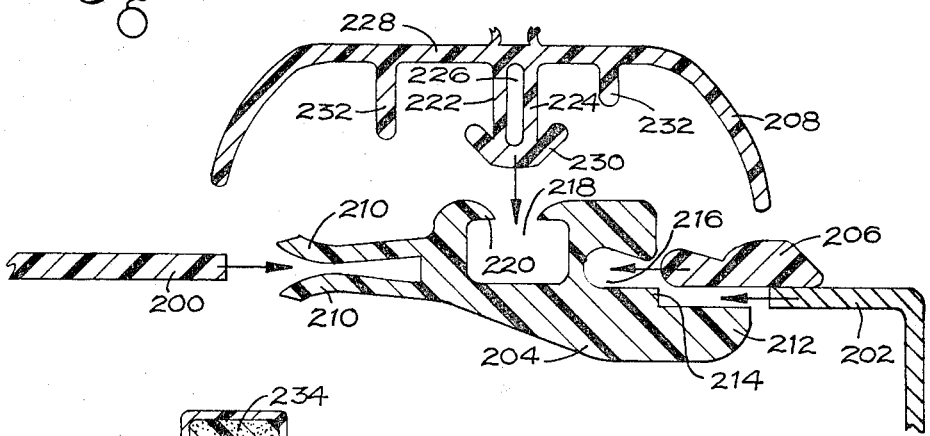
FIGURE 4 represents another variation of the invention, this being a three-piece gasket assembly shown prior to installation.
Figure 5:
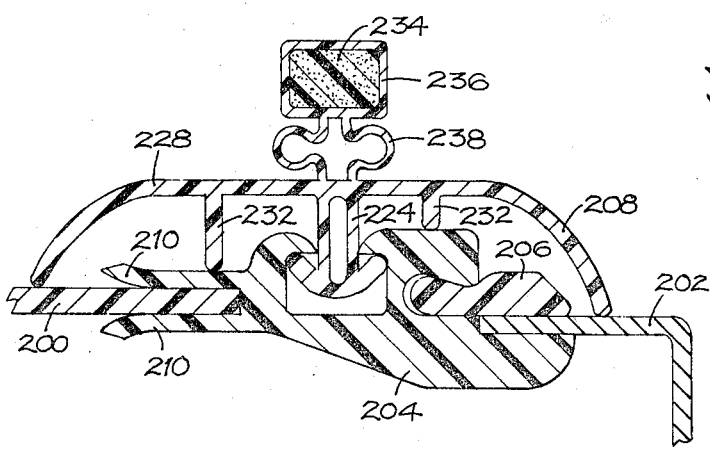
FIGURE 5 represents the gasket assembly of FIGURE 4 after installation.

FIGURES 4 and 5 show a three-piece gasket assembly which, like the previously described assembly, can be used in connection with a refrigerator door having foamed-in-place insulation or any other type of insulation, and which can be installed prior to or after assembly of the other parts of the door. FIGURE 4 is a exploded view of the assembly prior to assembly of an inner liner 200 and outer shell 202 of a refrigerator door. The assembly consists of an elongated rigid channel strip 204, a locking tab 206, and a sealing member 208. One side of the channel strip 204 comprises a pair of legs 210 which initially converge toward one another and then diverge to form a clamping member into which the inner liner 200 is inserted. A ledge 212 on the other side of the strip is adapted to receive the outer shell 202 which, when installed, abuts against shoulder 214. When the outer shell is properly positioned, the tab 206 is inserted into a groove 216 to hold the channel member 204 in place. A channel 218, intermediate the lateral edges of the channel strip 204, is provided with a pair of overhanging shoulders 220.

The sealing member 208 includes a snap-in tab 222 comprising a pair of generally parallel legs 224 separated from one another by a compression gap 226, and connected to the base 228. These parallel legs terminate in a wing tip 230 comprising two diverging arms which, when inserted in the channel 218, contact the overhanging lips 220. A pair of spacer ribs 232 serve, as can be seen in FIGURE 5, to insure a tight fit of the snap-in tab 222 within the channel 218. The sealing member contains a rectangular magnetic strip 284 within an appropriate channel 236 and spaced from the base 228 by a pair of thin flexible webs 238.

Referring now to FIGURE 6, there is shown another embodiment of the invention wherein the rigid retainer strip is at least partially supported by the insulation material occupying the space between the outer frame and inner liner of the door. The gasket assembly comprises a sealing member 250 and a relatively rigid channel member 252. An elongated groove in the channel member 252 is adapted to receive and grip the inwardly turned flange portion 254 of the metal shell 256. Leg 260 extending outwardly from the channel strip 252 forms a ledge upon which the inner liner 258 rests. The insulation 280 serves to hold the leg and the inner liner in their respective positions. A generally U-shaped channel 262, opening toward the edge of the door, is provided with a pair of inwardly turned lips 264 defining the opening of the channel.

The sealing member 250, preferably made out of a pliable material, comprises a planar base portion 268 connected by an intermediate wall 270 to a wedge-shaped locking tab 274. The sealing member is installed in the channel strip by urging the locking tab 274 into the opening of the channel strip. The wedged portion of the tab engages the lips 264 of the channel to prevent removal of the sealing member. A tubular sealing portion 266 is integrally connected to the base 268 and is adapted to be compressibly deformed against the refrigerator cabinet when the door is closed.

FIGURE 7 shows another modification of the invention, particularly applicable to refrigerators having two doors which are hinged on opposite sides of the refrigerator cabinet and which, when closed, abut one another at the center of the access opening to the cabinet. When a center mullion is not used to divide the access opening into two halves, it is necessary for the sealing gaskets on the respective doors to seal against one another as well as against the frame of the refrigerator. Co-pending application S.N. 464,483, filed on June 16, 1965 and assigned by the present inventor to the assignee of the present application is directed to refrigerator gaskets of the type applicable for use on this type of refrigerator. For purposes of the present invention, one of the embodiments covered by said application is modified to the extent that it incorporates the snap-in features of the present invention. This gasket comprises a first rigid member 302 adapted for installation between the inner liner 308 and outer frame 306 of a refrigerator door, and a flexible sealing member 316 adapted to be snapped into said rigid member. The rigid member 302 is provided with a flexible leg 304 whereby the member may be clamped on or otherwise attached to the outer shell 306. The member is provided with a recess 310 on which the inner liner 308 rests, abutting against shoulder 312. The member 302 is provided with a cavity 314, the opening of which is defined by an inwardly turned lip 318.

The sealing member 316 comprises a relatively flat base 319 terminating in a curved portion which contacts the liner 308 and which serves to conceal the rigid member 302. A locking tab 320, generally parallel to said base 319 and connected thereto by an intermediate wall member 322, is provided with a shoulder 327. When the sealing member is inserted into the groove 314, the rigid lip 318 snaps down in back of the shoulder 327 to thereby prevent removal of the sealing member 316.

Attached to, and spaced from the base 319 by two relatively thin flexible webs 326, is a channel 323 of rectangular cross section in which is provided a relatively short magnetic strip 324, which strip is adapted to hold the door against the frame of the refrigerator cabinet. Another rectangular channel 328 is connected by a flexible web 330 to the first channel 323 and by a second web 332 to the base 319. A flexible magnetic sealing strip 334 of rectangular cross section is disposed within and extends the entire length of this second channel 328. This magnetic sealing strip is adapted to be attracted to a corresponding magnet 336 comprising a portion of the gasket 338 on the other door. The polarity of the magnets 334, 336 is such that the magnets are attracted to one another when both doors are closed. When one door is opened, the force required to open the door is initially resisted by the attraction of these two magnets. However, when this force is overcome, the magnets reach a position where they are repelled from one another, and the opening of the door is facilitated. Upon closing the door, the magnets are initially repelled from one another until the door is almost completely closed whereupon the opposite poles of the respective magnets approach close enough to attract one another, thereby effecting a seal between the doors.

One method which can be used to construct and assemble the components of the door, including the gasket assembly, is to lay the outer shell of the door on a level surface so as to form a container defined by the edges and inwardly turned flanges of the shell. Thereafter, the rigid channel member is clamped on to the flange after which the ingredients of an appropriate foamable material such as polyurethane, along with a suitable foaming agent such as trichloromonofluoromethane, are introduced into the outer shell. The inner liner is then clamped to the rigid member or is alternatively placed on an appropriatte ledge of the member, and the foam is allowed to expand to fill the space between the shell and the liner and to solidify. Vents are preferably provided to permit the escape of air during the expansion of foam. It may be found desirable, prior to foaming, to insert a few spacers between the shell and the inner liner so that the entire weight of the liner does not rest upon the gasket channel member. After the foam has solidified, the sealing portion of the gasket can be installed by snapping the tab portion thereof into the appropriate channel of the channel strip.

It has been found that a mixture of finely divided barium ferrite and a suitable binder such as chlorinated polyethylene or chlorosulfonated polyethylene, can be readily extruded into a flexible strip which may then be magnetized to form a suitable magnet for use in those embodiments of the present invention that require a magnet. The details of a flexible magnet of this type are covered in U.S. 2,959,-832, issued to Max Baermann on Nov. 15, 1960. The gasket assembly of the present invention is typically used on all four sides of a refrigerator door. However, it is a common practice, when using a magnetic gasket, to omit the magnetic strip from the gasket used on the hinge side of the door inasmuch as an effective seal can be obtained along this side without a magnet.

It can be readily discerned that there are many advantages inherent in the gasket assembly of the type herein described. This type of assembly eliminates the necessity of using a metal retainer strip and screws to hold the gasket in place, as well as the manual labor which accompanies the use of a retainer strip.

There are many modifications and variations which can be made in carrying out the teachings of this invention without departing from the scope thereof. For example, variations can be made in the shape, size, and operation of the sealing portion of the gasket since the critical aspects of the invention reside in the method of attaching the gasket to the refrigerator rather than in the type of seal that is effected between the door and refrigerator. Furthermore, the types of material which are used to form the various components of the gasket assembly can be varied. For example, the channel portion of the gasket assembly may be made from a rigid material such as unplasticized polyvinyl chloride and the sealing member of a plasticized polyvinyl chloride. However, it is obvious that the channel member can be composed of one material such as polystyrene, a polycarbonate, or even metal, while the sealing member may be made from a soft polymer such as polyvinyl chloride or ethylene vinyl acetate. Inasmuch as the rigid channel member is concealed from view by the overlying base of the sealing member, it is not necessary that the former having surface characteristics which are pleasing in appearance.

These components, when they are polymers, can be produced by molding or the like; however, they are preferably made by a process utilizing continuous extrusion and curing. Although the sealing member is desirably composed of a pliable polymeric material, it can be prepared by dual extrusion so as to form a rigid snap-in tab integrally mated to a pliable sealing portion. Likewise, the channel member can be made by dual durometer extrusion.

It is obvious that this invention is not limited in application to refrigerators, but is likewise applicable to freezers and other types of thermally insulated containers. Furthermore, other modifications can be made without departing from the scope of the invention which is delimited by the following claims in which I claim:

1. A gasket assembly for a refrigerator door provided with an outer shell and an inner liner, the respective edges of which are co-planar and are spaced apart from one another, said assembly comprising:
   (a) an elongated, relatively rigid, channel strip containing a channel portion defined by a pair of parallel sides and a base, each of said sides terminating in an overhanging lip inwardly directed toward one another and defining the opening of the channel, a pair of legs joined to and extending laterally away from one of said sides and forming a clamping member to grip one of either the shell or the liner, a ledge and shoulder extending laterally away from the other of said sides to abut against the other of said shell or liner and a groove laterally inwardly of said shoulder,
   (b) a locking tab coextensive with said channel strip but separate therefrom, received in said groove, with a portion of said tab extending laterally outwardly therefrom and overlying said ledge to urge said other of said shell or liner firmly against said ledge, and
   (c) a separate sealing member comprising a first portion consisting of a locking tab inserted into the channel strip and engageable with the overhanging lips thereof to resist removal therefrom, and a sealing portion adapted to engage the frame of the refrigerator and to form a seal therewith.

2. A gasket assembly for a refrigerator door provided with an outer shell and an inner liner the respective edges of which are co-planar and spaced apart from one another, said assembly comprising:
   (a) an elongated relatively rigid polymeric channel strip wherein the sides of the channel are parallel to one another and each terminate in an overhanging lip defining the opening of the channel, a pair of legs extending laterally outwardly from one of said sides to form a gripping member adapted to grip either one of said shell or liner, a ledge and a shoulder extending laterally outwardly from the other of said parallel sides adapted to receive and abut against the other of said shell or liner and a groove disposed laterally inwardly from said shoulder, (b) an elongated locking tab received in said groove of said channel strip with a portion of said tab extending laterally outwardly from said groove and overlying said ledge to lock said channel strip in place against the surface of one of said inner liner or said outer shell, and (c) a sealing member comprising a flexible base having a snap-in tab inserted within said channel, said tab comprising a pair of co-pending parallel legs spaced apart from one another, one end of said legs attached to said flexible base and the other end terminating in a mutually connecting pair of arms which diverge from one another obliquely toward said base and which contact said overhanging lips in the channel to lock the sealing member in place and a rib attached to the underside of the base on either side of said snap-in tab in contact with the rigid channel strip to minimize movement of the snap-in tab within said channel.

References Cited
UNITED STATES PATENTS

| | | | |
|---|---|---|---|
| 2,607,966 | 8/1952 | Beck | 49—486 |
| 2,693,009 | 11/1954 | Beck | 49—486 |
| 3,126,589 | 3/1964 | Monti | 49—482 |
| 3,126,590 | 3/1964 | Monti | 49—478 |
| 3,137,900 | 6/1964 | Carbary | 49—487 |
| 3,226,367 | 12/1965 | Monti | 49—487 |
| 3,242,537 | 3/1966 | Monti | 49—487 X |
| 3,289,352 | 12/1966 | Heilweil et al. | 49—478 X |
| 3,323,256 | 6/1967 | Reahard | 49—493 X |

KENNETH DOWNEY, *Primary Examiner.*